Albert William Chamberlain
Alan Hawker Chamberlain
Howard Francis Winter Chamberlain
INVENTORS April 23, 1935.   A. W. CHAMBERLAIN ET AL   1,998,922
HYDRAULIC POWER TRANSMISSION MECHANISM
Filed June 7, 1932   6 Sheets-Sheet 4

INVENTORS
Albert William Chamberlain,
Alan Hawker Chamberlain
Howard Francis Winter Chamberlain
By Otto Munk their Attorney April 23, 1935. A. W. CHAMBERLAIN ET AL 1,998,922
HYDRAULIC POWER TRANSMISSION MECHANISM
Filed June 7, 1932    6 Sheets-Sheet 5

Albert William Chamberlain
Alan Hawker Chamberlain
Howard Francis Winter Chamberlain
INVENTORS By Otis Trunk
Their Attorney.

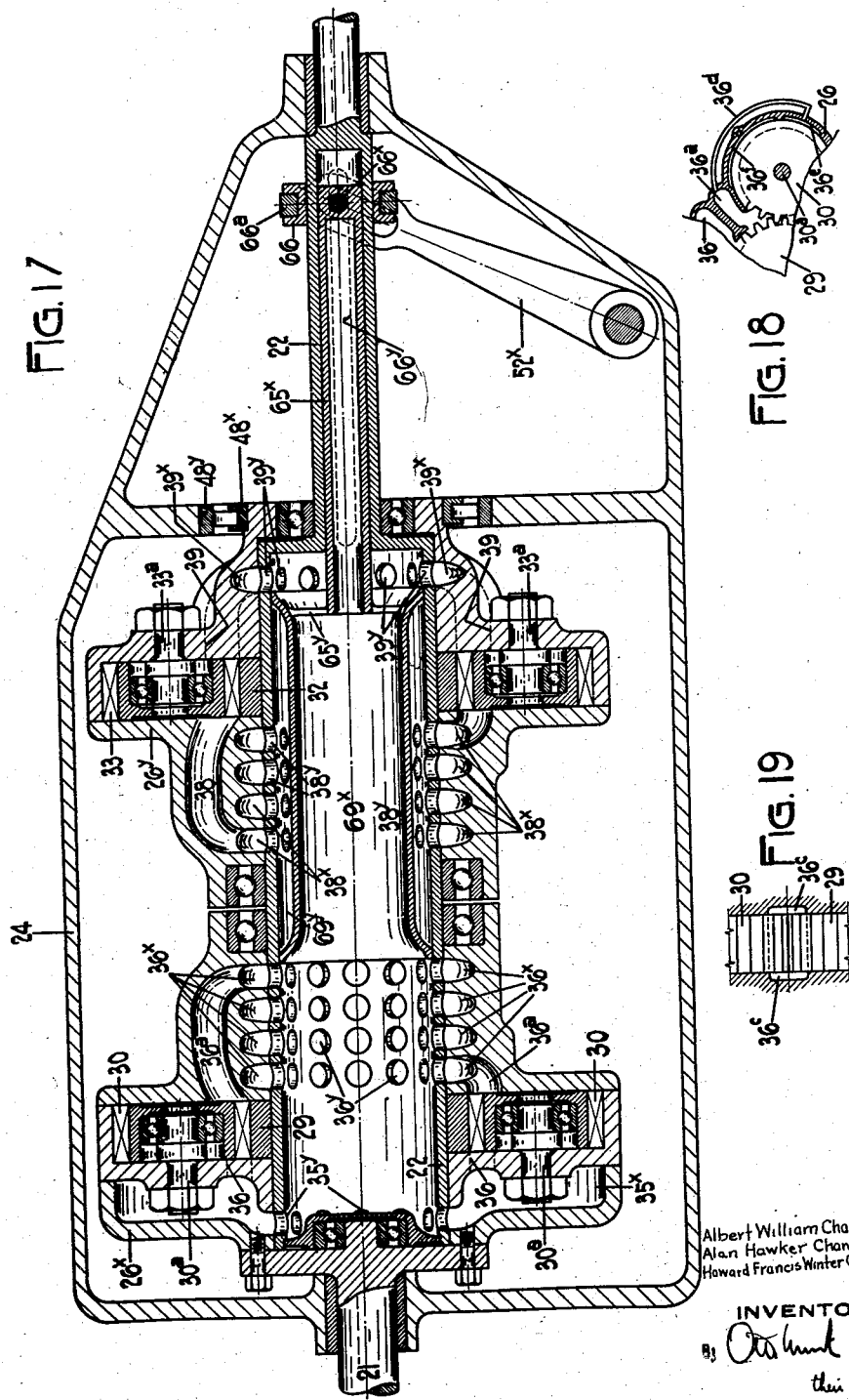

Patented Apr. 23, 1935

1,998,922

UNITED STATES PATENT OFFICE 1,998,922

HYDRAULIC POWER TRANSMISSION MECHANISM

Albert William Chamberlain, Alan Hawker Chamberlain, and Howard Francis Winter Chamberlain, Brunswick, Victoria, Australia Application June 7, 1932, Serial No. 615,860
In Australia June 11, 1931

15 Claims. (Cl. 60—53)

This invention relates to hydraulic power transmission mechanism which combines the functions of a clutch and change speed gear and which is particularly suitable for use in automobiles but is applicable to other purposes.

Transmission mechanism according to this invention is characterized by the combination with a driving member and a driven member of two units each having a central gear and a plurality of planetary pinions, adapted to be connected by a body of liquid and so arranged that when liquid at the delivery side of one of the units is under pressure motion is transmitted from the driving member to the driven member with proportionate increased torque at reduced speeds.

Features of the invention include means whereby the effective relative capacity of the units may be varied to control the hydraulic pressure to cause transmission of motion in the same direction at variable speeds; means to stop the flow of liquid between the said units so as to cause the driven member to be rotated at the same speed as the driving member; and means whereby the relative capacity of the units may be varied so as to cause the driven member to be rotated in the opposite direction to the driving member at reduced speeds.

Other features of this invention include means whereby the pressure of liquid on movable members is balanced to facilitate control thereof; means whereby pressure is balanced relatively to each planetary pinion to relieve load on its bearing; and means to provide an unrestricted escape for liquid at the ends of the teeth in addition to means for ingress and egress of liquid on the faces of the teeth.

A further feature of this invention is the combination with the said units of a revolvable liquid container, a fixed structure, a one-way engaging brake, and brake mechanism whereby the said brake may be locked.

Another feature of this invention is liquid flow control valve mechanism which under certain conditions allows the driven member to over-run the driving member.

Still further features of the invention include means to maintain reservoirs completely filled with liquid; means to prevent accumulation of air and bubbles in said reservoirs; and means to compensate pulsations and shocks to prevent hammer.

Any suitable liquid is usable but the preferred liquid is an oil the viscosity of which remains reasonably constant at varying temperatures. In this description the term oil includes all suitable liquids.

The above and other features of the invention as embodied in transmission mechanism suitable for automobiles will now be fully described with reference to the accompanying drawings which are to some extent diagrammatic.

In the drawings:

Fig. 17 is a longitudinal vertical section of a modified arrangement in which one unit is adapted to function as a pump and the other unit as a motor.

Fig. 18 is a detail sectional view showing means to balance pressure relatively to a planetary pinion.

Fig. 19 is a detail sectional view showing means to provide an unrestricted escape for liquid at the ends of the teeth of a gear unit.

Figure 1:
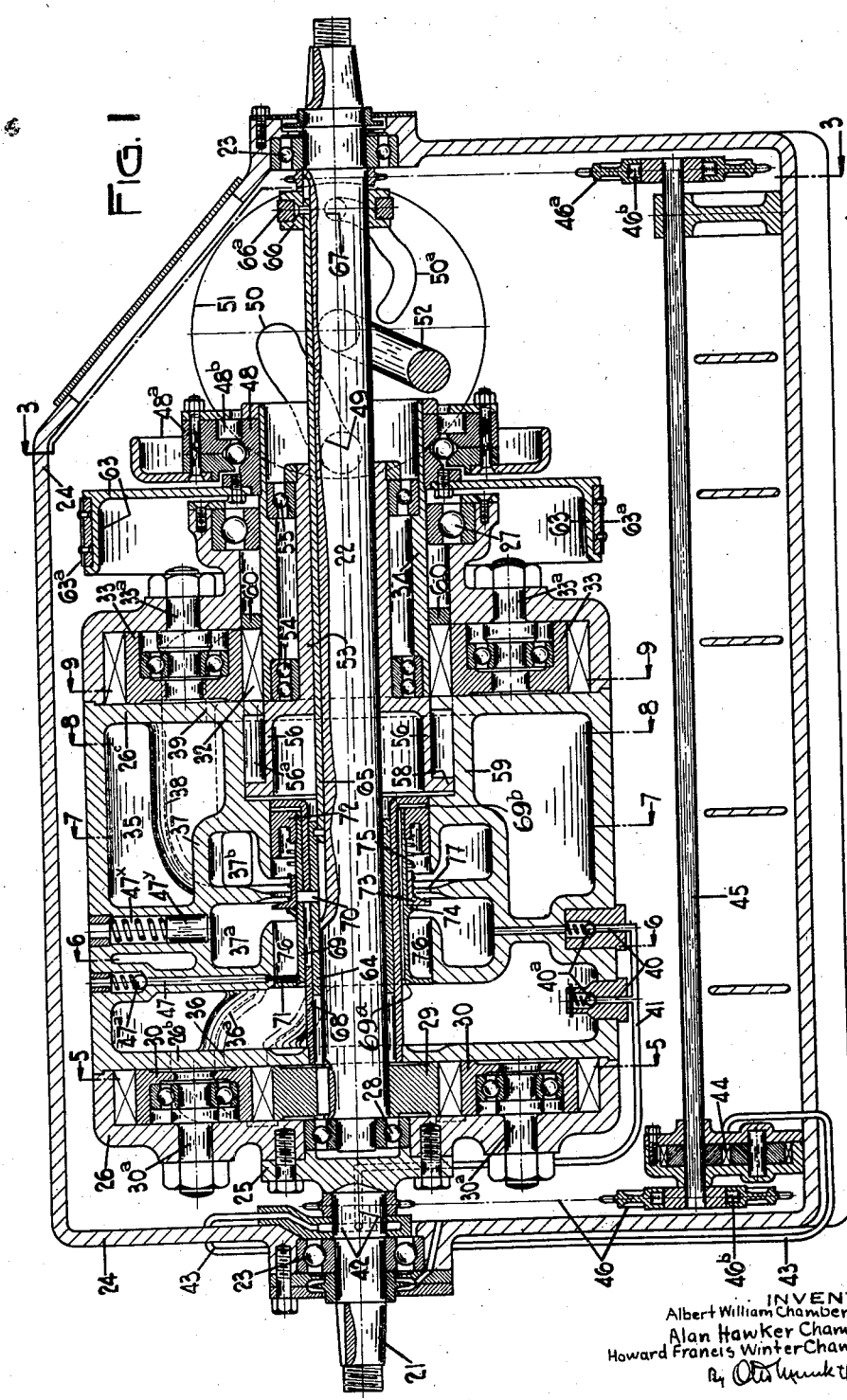
Fig. 1 is a longitudinal vertical section of an arrangement in which one gear unit is adapted to function both as a pump and as a motor and the other unit is of variable capacity and is adapted to function as a liquid flow and pressure control means or as a pump to cause motion to be transmitted in the reverse direction, the parts being shown in the latter position.
Figure 2:
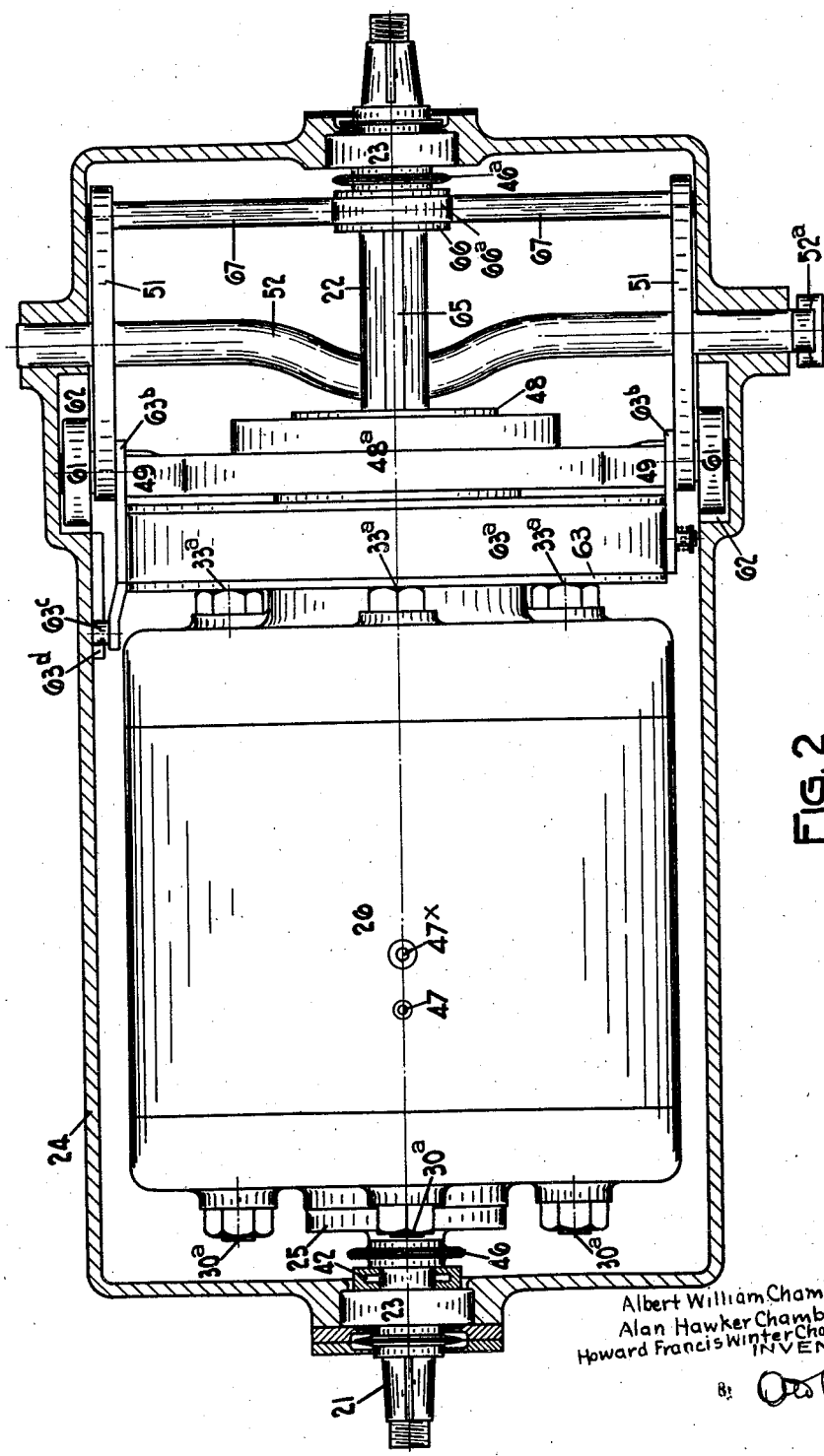
Fig. 2 is a plan of parts in Figure 1 but with the outer casing and parts adjacent to the driving and driven members in central section.
Figure 3:
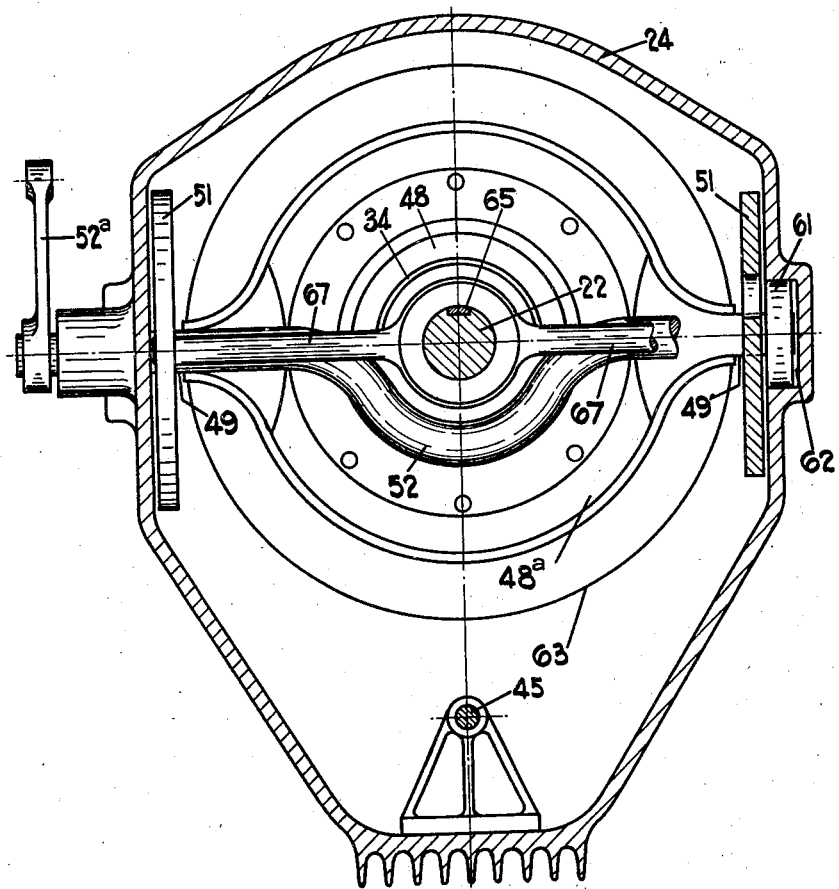
Fig. 3 is a transverse section mainly on line 3—3 of Figure 1 but with some parts broken away.
Figure 4:
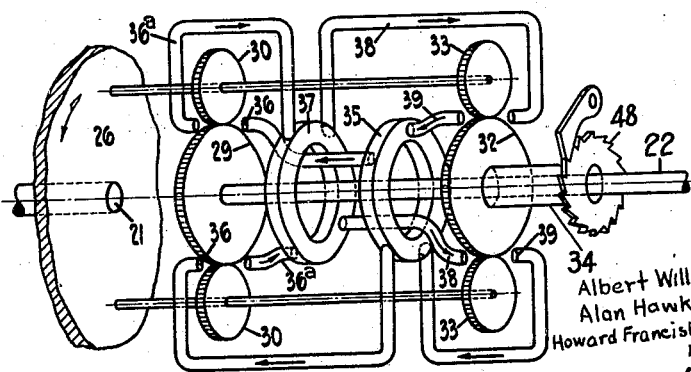
Fig. 4 is a perspective view showing some of the parts in Figure 1 diagrammatically.
Figure 5:
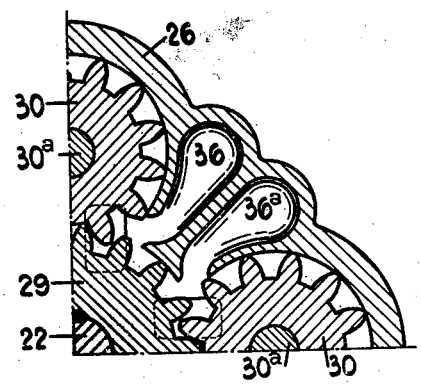
Figs. 5-9 are transverse sections showing some of the parts on respective lines 5—5, 6—6, 7—7, 8—8, and 9—9 of Figure 1. As the parts on these section lines are symmetrical relatively to the axis of rotation the quadrant shown is typical of the whole section.
Figure 6:
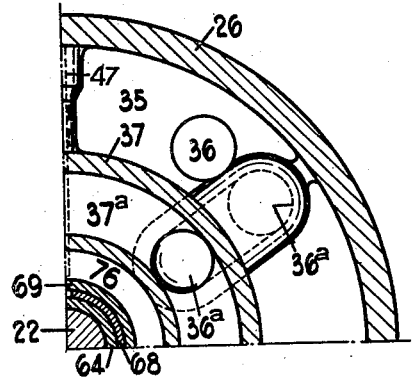
Figure 7:
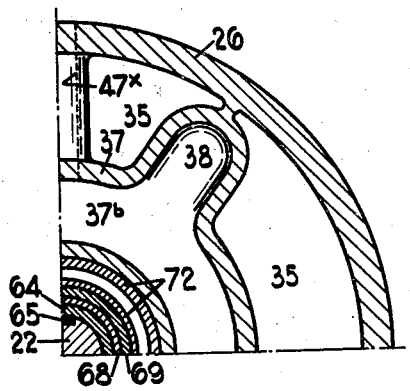
Figure 8:
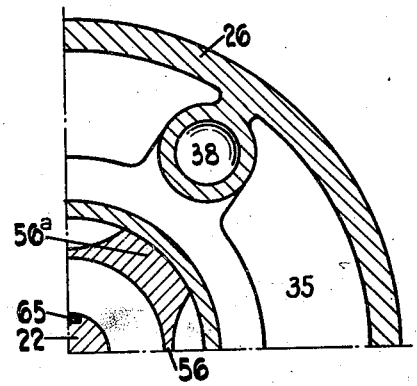
Figure 9:
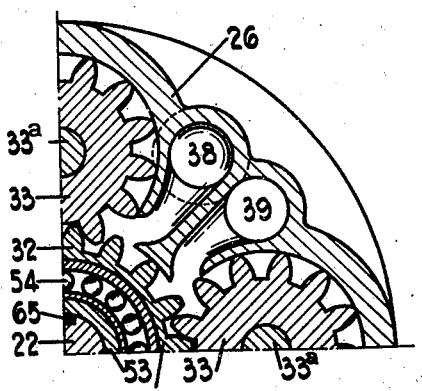
Figure 10:
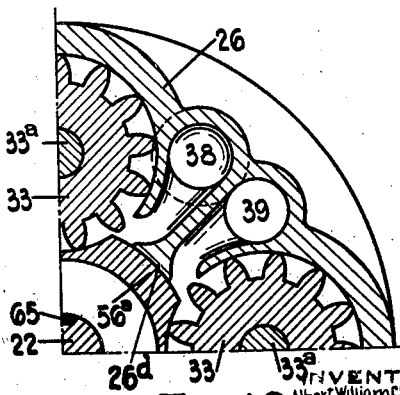
Fig. 10 is a similar view to Figure 9 but with the parts in a different position, the centre gear having been moved beyond the line on which the section is taken.
Figure 11:
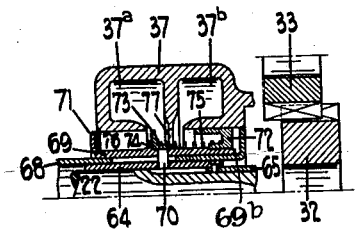
Figs. 11-16 show the control valve in Figure 1 and associated spur gear pump mechanism in positions which correspond respectively with neutral, intermediate speed, top speed, top speed with valve in over-running position, top speed without over-run and reverse.
Figure 12:
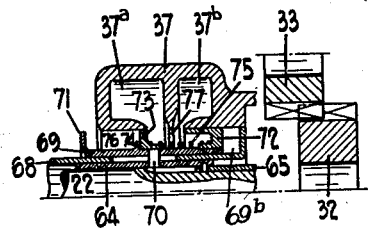
Figure 13:
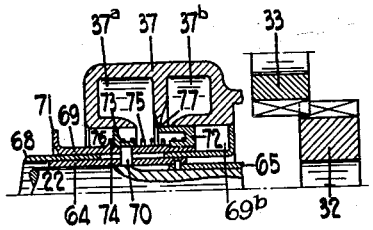
Figure 14:
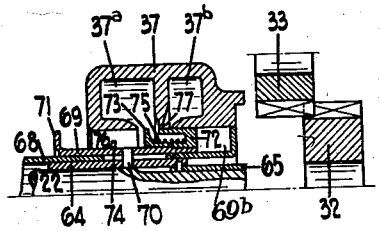

Referring to the construction shown in Figures 1 to 16 and particularly to Figures 1–3, 21 is a driving shaft and 22 a co-axial driven shaft, and they may represent respectively the engine shaft and the tail shaft of an automobile. These shafts are supported in bearings 23 relatively to a fixed casing 24 which is connected to any convenient support, for example an adjacent chassis member. Shaft 21 is connected by a coupling 25 to one end a cylindrical casing 26 the other end of which is supported by a ball bearing 27 relatively to shaft 22. The adjacent end of shaft 22 is supported co-axially with shaft 21 by a ball bearing 28 carried by coupling 25.

One gear unit comprises a gear 29 fixed to shaft 22 and a plurality of planetary pinions 30

(four for example) each of which is freely rotatable on an axle 30ª fixed to casing 26. The other gear unit comprises a gear 32 fixed to a slidable sleeve 34 and a plurality of planetary pinions 33, each of which is freely rotatable on an axle 33ª fixed to casing 26. Sleeve 34 carries bearings 27 and as hereinafter described is arranged so that it is normally free to rotate in a forward direction but is held against movement in the reverse direction.

The output of a gear pump varies with the relative angular position of the meshing teeth, resulting in a fluctuating output and hammer, and to minimize this defect the number of teeth on each gear wheel 29 and 32 is such that it is not divisible by the number of pinions in the respective series associated with it. 35 is an oil reservoir between casing partitions 26ᵇ and 26ᶜ. Associated with each planetary pinion 30 is an inlet port 36 and an outlet passage 36ª.

Ports 36 are open to reservoir 35 and passages 36ª communicate with part 37ª of a reservoir 37 from part 37ᵇ of which extend passages 38 one of which is associated with the inlet side of each planetary pinion 33 from which is an outlet 39 leading to reservoir 35. The said ports and passages are so arranged that resistance to ingress and egress of liquid to and from the faces of the teeth of each unit is minimized, and in addition, to provide an unrestricted escape for liquid at the ends of the teeth suitably located clearances 36ᶜ are provided (see Figure 19).

To balance pressure to relieve load on the bearings of the planetary pinions each outlet is connected by a passage 36ᵈ to a balance port 36ᵉ and in addition there is between the pressure points a clearance 36ᶠ (see Figure 18) which is connected to reservoir 35 in any suitable manner.

Each reservoir has an oil supply port 40 provided with a non-return valve 40ª and connected by a pipe 41, passages 42 and a pipe 43 to a pump 44 at the base of casing 24. Pump 44 is actuated by a shaft 45 which is driven by chain and sprocket gear 46, 46ª, an over-running clutch 46ᵇ being provided in the driven sprocket of each gear.

Any suitable number of outlets 47 (one shown) each having a valve 47ª extend from suitable positions near the centre of the reservoirs for escape of air bubbles and oil foam. One outlet 47 from a passage 76 hereinafter referred to is sufficient in some cases.

47ʸ is a spring loaded plunger which is in contact with oil under pressure and which is adapted to compensate pulsations and shocks. This plunger is suitably located as in an open ended passage 47ˣ.

Fixed to sleeve 34 is the inner member 48 of an over-running brake. The outer member 48ª of this brake carries diametral projections 49, each of which engages a cam slot 50 in a disc 51 fixed on a cranked rock shaft 52 which is supported in bearings on the outer fixed casing 24 and one end of which projects to carry a control lever 52ª. When discs 51 are rotated by operation of lever 52ª the co-action of projections 49 with their respective slots 50 causes sliding movement to be transmitted through projections 49, brake members 48ª and 48 and sleeve 34 to gear 32 to vary the capacity of unit 32—33. Sleeve 34 is supported relatively to a slidable sleeve 53 by a radial ball bearing 54 and a combined radial and thrust bearing 55 so that although sleeve 34 is freely rotatable, longitudinal movement is transmitted through bearing 55 to sleeve 53.

On an extension 56 of sleeve 53 are projections 56ª which correspond in shape with contiguous parts of gear wheel 32 and which move therewith to co-operate with pinions 33 and parts 26ᵈ of casing 26 to prevent escape of oil when said gear is moved from the full mesh position.

A circular flange 58 on member 56 which slidably fits inside a wall 59 and a ring 60 which surrounds the outer face of gear wheel 32 co-operate to balance hydraulic pressures relatively to gear 32 to facilitate free longitudinal movement.

To hold member 48ª against rotation but allow longitudinal movement each member 49 extends beyond its disc 51 and carries a roller 61 located in a runway 62 on casing 24. Rollers 48ᵇ between brake members 48, 48ª allow the inner member to rotate freely in one direction but prevent relative movement in the opposite direction. This arrangement permits gear 32 to over-run.

Brake member 48 is connected by anchor plates 63ᵇ to the band 63ª of a brake drum 63. An extension on a plate 63ᵇ carries a roller 63ᶜ which is in a converging slot 63ᵈ so that when gear 32 is moved to cause reverse motion to be transmitted the brake 63ª is operated to hold brake member 48.

64 is a slidable valve control sleeve which is adapted to be moved longitudinally by a member 65 slidably housed in a recess in shaft 22. The connection between sleeve 64 and member 65 is such that sleeve 64 may rotate freely. This connection is shown diagrammatically in Figures 1 and 11 to 16. The outer end of member 65 is connected through collar 66 to a non-rotatable shoe 66ª having projections 67 each of which engages a cam groove 50ª in a disc 51.

Cam grooves 50 and 50ª are so arranged that rotation of discs 51 causes co-operating differential movement to be imparted to the gear 32 and to the sleeve 64.

A sleeve 68 which extends from casing 26 surrounds sleeve 64 and another sleeve 69 which is about sleeve 68 is connected to sleeve 64 by a pin 70 which is slidable in a slot in sleeve 68. At opposite ends of sleeve 69 are valve rings 71 and 72 respectively, between which is a movable valve ring 73 which is normally pressed against a stop 74 by a spring 75. There is an oil passage 69ª to an annular chamber 69ᵇ so that the hydraulic pressure is balanced relatively to sleeve 69.

Members 71, 72 and 73 are adapted to co-operate with an annular passage 76 between reservoir 35 and reservoir part 37ª while member 72 is also adapted to cooperate with an annular port 77 connecting reservoir parts 37ª and 37ᵇ.

In operation when shaft 21 is revolving and annular passage 76 and annular port 77 are open, oil will flow (see Figure 4) from the reservoir 35 through ports 36, unit 29—30, passages 36ª, reservoir 37, passages 38, unit 32—33 and ports 39 back to reservoir 35. When gear 32 is set so that the capacity of unit 32—33 is equal to the capacity of unit 32—33 is equal to the capacity of unit 29—30 (see Figure 11), planetary pinions 30 and 33 will revolve about their respective gear wheels and oil will flow freely. Under these conditions gear 29 remains stationary and no motion is transmitted to shaft 22. With the parts in this position, if the engine is stopped, gear 29 and shaft 22 are free to turn in either direction; this would permit a vehicle fitted with the invention to be moved by external power.

If control lever 52ª be operated so as to move gear 32 to reduce the capacity of unit 32—33 and to move valve parts so that member 73 closes passage 76 (Figure 12) the full volume of oil which would be delivered by unit 29—30 if gear 29 were stationary could not pass through unit 32—33 and the oil in passages 36ª, reservoir 37 and passages 38 will be under pressure which reacts causing gear 29 to revolve in the same direction as the planetary pinions 30, casing 26 and the driving shaft 21.

Motion in reduced ratio with proportionate increased torque is thus transmitted to the driven shaft 22. As the capacity of unit 32—33 is further decreased the speed of the driven shaft will increase in infinitely variable ratio within the limit of movement of gear 32. The shape of cam groove 50 is such that after the capacity of unit 32—33 has been reduced to the minimum to attain the highest reduced speed, further movement of discs 51 will not cause movement of gear 32 but such further movement by reason of the shape of cam groove 50ª is transmitted to the valve sleeve 69 so that member 72 closes annular port 77, the parts then being in the position shown in Figure 13.

Figure 15:
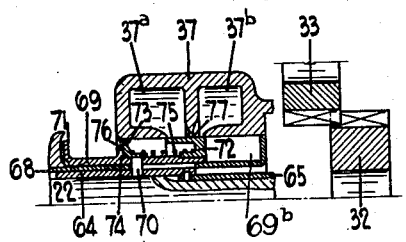
Figure 16:
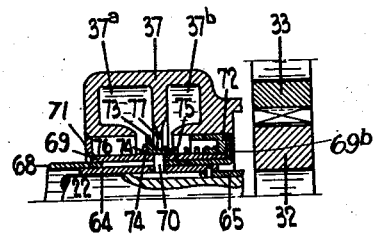

Closure of port 77 stops the oil flow and locks pinions 30 relatively to gear 29 causing shaft 22 to be revolved at the same speed as shaft 21. Assuming now that with the parts in this position the engine be stopped as when an automobile is coasting or that conditions are such that the shaft 22 tends to travel faster than shaft 21, then gear 29 must be free to over-run. As soon as gear 29 tends to over-run pressure is exerted on the oil in reservoir 35 and valve member 73 moves against the pressure of spring 75 to the position in Figure 14. Oil may then circulate freely from reservoir 35 through passage 76, reservoir part 37ª, passages 36ª, unit 29—30 and ports 36 back to reservoir 35. When it is not desirable to permit gear 29 to over-run the valve parts are moved until member 72 closes port 76 as shown in Figure 15.

It will be clear that movement of control lever 52ª in opposite direction will cause motion to be transmitted at reducing speeds until the neutral position is again reached. If gear wheel 32 is moved from neutral position (Figure 11) further into mesh with its pinions the capacity of unit 32—33 is increased so that it is greater than the capacity of unit 29—30 and at the same time valve member 71 is moved to close passage 76. Simultaneously, band 63ª is operated to hold brake member 48 as before described. As pinions 33 rotate around their gear 32 at the same speed as pinions 30 around gear 29 and as the passage 76 is closed by member 71, liquid in reservoir 35 which is then at the delivery side of the unit 32—33 will be under pressure, and brake member 48 being held, unit 29—30 will operate as a motor and drive shaft 22 in the reverse direction.

In the arrangement shown in Figure 17 unit 29—30 functions as a pump and unit 32—33 functions as a motor to transmit motion to shaft 22 at a speed which is controlled by the quantity of oil under pressure admitted to unit 32—33 and the distribution of such oil to its planetary gears. In this case gear wheels 29 and 32 are both fixed to shaft 22, the axles 30ª of pinions 30 are carried by a casing 26ˣ fixed to the end of shaft 21 and the axles 33ª of pinions 33 are carried by a freely revolvable casing 26ʸ which carries the inner member 48ˣ of an over-running brake the outer member 48ʸ of which is fixed to casing 24.

In this construction shaft 22 is hollow and contains a slidable valve 69ˣ which has an annular valve passage 69ʸ and which is connected by spider 65ʸ to a member 65ˣ which is in turn connected to a collar 66 by a pin 66ˣ which is slidable in a slot 66ʸ in shaft 22. The non-rotatable shoe 66ª of collar 66 is connected to a control lever 52ˣ.

The interior of casing 26ˣ constitutes a reservoir 35ˣ having inlet ports 36 associated with unit 29—30 and which is connected to the interior of shaft 22 by ports 35ʸ. Each outlet passage 36ª of unit 29—30 terminates in an annular passage 36ˣ which is connected to the interior of shaft 22 by ports 36ʸ.

Another series of ports 38ʸ connect the interior of shaft 22 to a plurality of annular passages 38ˣ from which extend respective passages 38 associated with the inlets of unit 32—33 the outlets 39 of which are connected by an annular passage 39ˣ and ports 39ʸ with the interior of shaft 22.

The position illustrated corresponds with "neutral" the valve being located so that ports 38ʸ are closed and ports 36ʸ and 35ʸ are connected through shaft 22. Oil will thus circulate freely passing from reservoir 35ˣ through ports 36, unit 29—30 passages 36ª and 36ˣ, ports 36ʸ, shaft 22 and ports 35ʸ back to reservoir 35ˣ. Unit 32—33 is inoperative and no motion is transmitted to shaft 22, but brake 48ˣ—48ʸ allows this shaft to be rotated forwardly if the vehicle is moved by independent power.

For transmission of low speed the valve 69ˣ is moved so that its passage 69ʸ connects one annular series of ports 36ʸ to all ports 38ʸ. Thus the outlet relatively to one pinion of unit 29—30 is distributed relatively to all the pinions of unit 32—33. The torque reaction is taken by the over-running brake 48ˣ—48ʸ and gear 32 and shaft 22 rotate slowly. In this position the output of the other pinions 30 of the pump unit 29—30 is by-passed through passages 36ˣ, ports 36ʸ, shaft 22 and ports 35ʸ back to reservoir 35ˣ.

For higher speeds the valve is adjusted first to connect more of the ports 36ʸ to all the ports 38ʸ and for still higher speeds the ports 38ʸ are closed in succession.

When all ports 38ʸ are closed and all ports 36ʸ are connected to valve passage 69ʸ the oil flow is stopped thus locking unit 29—30 and causing shaft 22 to be rotated at the same speed as shaft 21. Supply of oil to unit 32—33 being cut off the over-running brake 48ˣ—48ʸ allows this unit and its associated casing 26ʸ to rotate with shaft 22.

We claim:

1. In hydraulic power transmission mechanism, a revolvable casing, a liquid circulation system in said casing, a gear pump unit of fixed capacity and a gear pump unit of variable capacity each comprising a centre gear and a plurality of planetary pinions disposed in said system, means to rotatively support the planetary pinions relatively to the casing, a driving member to rotate said casing, a driven member connected to the centre gear of the fixed capacity unit, a one-way engaging brake mechanism whereby the centre gear of the variable capacity unit is held against rotation in the reverse direction relatively to the driving member when the capacity of the variable unit is less than that of the fixed capacity unit, whereby forward motion is transmitted at reduced speed to the driven member, and means whereby the centre gear of the variable capacity unit is held against rotation in the same direction as the driving member when the capacity of the variable unit is greater than that of the fixed capacity unit whereby motion is transmitted to the driven member in the reverse direction relatively to the driving member.

2. Hydraulic power transmission mechanism, as claimed in claim 1 with a duct connecting the fluid circulation system and the input of the fixed capacity unit and means to close said duct when the capacity of the variable capacity unit is less than that of the fixed capacity unit.

3. Hydraulic power transmission mechanism, as claimed in claim 1, with a duct connecting the fluid circulation system and the input of the fixed capacity unit and means whereby when the variable capacity unit has attained its minimum capacity position the flow of liquid through the circulation system is stopped and the said duct is closed.

4. Hydraulic power transmission mechanism, as claimed in claim 1, with a duct connecting the fluid circulation system and input of the fixed capacity unit, means whereby when the variable capacity unit has attained its minimum capacity position the flow of liquid through the circulation system is stopped and means whereby the said duct is also closed in such manner that when pressure is exerted on the liquid at the input side of the fixed capacity unit the duct opens, short circuiting the fixed capacity unit so that the centre gear of the last mentioned unit and the driven member may over-run.

5. Hydraulic power transmission mechanism, as claimed in claim 1, with a duct connecting the fluid circulation system and the input of the fixed capacity unit, means whereby when the variable capacity unit has attained its minimum capacity position the flow of liquid through the circulation system is stopped and means whereby the said duct is closed, the last mentioned means being resiliently held in operative position so that when liquid at the input side of the fixed capacity unit is under pressure said means are actuated to open said duct to short circuit the last mentioned unit to allow the centre member of the said unit and the driven member to over-run.

6. Hydraulic power transmission mechanism, as claimed in claim 1, with a duct connecting the liquid circulation system and the input of the fixed capacity unit, means whereby when the variable capacity unit has attained its minimum capacity position the flow of liquid through the circulation system is stopped and the said duct is closed to prevent over-run of the driven member.

7. Hydraulic power transmission mechanism, as claimed in claim 1, with a duct connecting the liquid circulation system and the input of the fixed capacity unit, and means whereby said duct is closed when the capacity of the variable capacity unit is greater than that of the fixed capacity unit.

8. Hydraulic power transmission mechanism, as claimed in claim 1, with a sleeve surrounding the driven member, an annular duct surrounding said sleeve, said duct connecting the liquid circulation system and the input of the fixed capacity unit, valve means carried by said sleeve to control said duct, and means to operate the valve means so that said duct is opened when the capacities of the fixed capacity unit and the variable capacity unit are equal.

9. Hydraulic power transmission mechanism, as claimed in claim 1, with a sleeve surrounding the driven member and an annular duct surrounding said sleeve, said duct connecting the liquid circulation system and the input of the fixed capacity unit, valve means carried by said sleeve to control said duct, and means to operate the valve means whereby said duct is closed when the capacity of the variable capacity unit is less than the capacity of the fixed capacity unit.

10. Hydraulic power transmission mechanism, as claimed in claim 1, with a sleeve surrounding the driven member and an annular duct surrounding said sleeve, said duct connecting the liquid circulation system and the input of the fixed capacity unit, valve means carried by said sleeve to control said duct, and means to operate the valve means so that said duct and the liquid circulation system are both closed when the variable unit is in the minimum capacity position.

11. Hydraulic power transmission mechanism, as claimed in claim 1, with a sleeve surrounding the driven member and an annular duct surrounding said sleeve, said duct connecting the liquid circulation system and the input of the fixed capacity unit, valve means carried by said sleeve to control said duct and the liquid circulation system and means to operate the said valve means so that said duct and the liquid circulation system are both closed when the variable capacity unit is in the minimum capacity position, the means to close the duct being resiliently held so that it may open when liquid at the input side of the fixed capacity unit is under pressure to permit the centre gear of the fixed capacity unit and the driven member to over-run.

12. Hydraulic power transmission mechanism, as claimed in claim 1 with a sleeve surrounding the driven member and an annular duct surrounding said sleeve, said duct connecting the liquid circulation system and the input of the fixed capacity unit, valve means and means to operate said valve means to close the said duct when the capacity of the variable capacity unit is greater than that of the fixed capacity unit.

13. Hydraulic power transmission mechanism, as claimed in claim 1, with a sleeve surrounding the driven member and an annular duct surrounding said sleeve, said duct connecting the liquid circulation system and the input of the fixed capacity unit, valve means carried by said sleeve, said valve means being arranged to close said duct and said liquid circulation system to prevent over-run of the driven member.

14. Hydraulic power transmission mechanism, as claimed in claim 1, a liquid supply pump, two connections from said pump to the liquid circulation system and a non-return valve in each said connection, the connections being so located that liquid to make up losses will be delivered under pressure to the low pressure side of the liquid circulation system.

15. Hydraulic power transmission mechanism, as claimed in claim 1, a leak pipe extending from the part nearest the centre of the liquid circulation system to permit air and oil foam to be expelled when the mechanism is revolving.

ALBERT WILLIAM CHAMBERLAIN.
ALAN HAWKER CHAMBERLAIN.
HOWARD FRANCIS WINTER CHAMBERLAIN.